(12) United States Patent
Asaoka (10) Patent No.: US 8,989,796 B2
(45) Date of Patent: Mar. 24, 2015

(54) METHOD FOR ADJUSTING PARAMETER OF RADIO COMMUNICATION SYSTEM AND RADIO COMMUNICATION SYSTEM

(75) Inventor: Susumu Asaoka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 165 days.

(21) Appl. No.: 13/641,683

(22) PCT Filed: Apr. 25, 2011

(86) PCT No.: PCT/JP2011/002428
§ 371 (c)(1),
(2), (4) Date: Oct. 16, 2012

(87) PCT Pub. No.: WO2011/135842
PCT Pub. Date: Nov. 3, 2011

(65) Prior Publication Data
US 2013/0065516 A1 Mar. 14, 2013

(30) Foreign Application Priority Data
Apr. 26, 2010 (JP) .................. 2010-101434

(51) Int. Cl.
*H04B 7/00* (2006.01)
*H04W 24/02* (2009.01)
(Continued)

(52) U.S. Cl.
CPC ............ *H04W 24/02* (2013.01); *H04W 52/367* (2013.01); *H04W 52/46* (2013.01); *H04W 84/047* (2013.01); *H04W 52/143* (2013.01); *Y02B 60/50* (2013.01)
USPC ................. 455/522; 455/25; 455/7; 455/13.4; 455/447; 455/502; 455/507; 370/252; 370/315; 370/332

(58) Field of Classification Search
CPC ....... H04W 28/08; H04W 4/02; H04W 88/06; H04W 24/08; H04W 48/16; H04W 52/367; H04W 84/047; G06F 3/015; G06F 3/016; G06F 3/0487

USPC ........... 455/522, 25, 7, 13.4, 422.1, 423, 424, 455/447, 502, 507; 370/252, 310, 315, 318, 370/332
See application file for complete search history.

(56) References Cited

U.S. PATENT DOCUMENTS 7,885,651 B2    2/2011    Akihara
2001/0017942 A1  8/2001   Kalevo et al.
(Continued)

FOREIGN PATENT DOCUMENTS

JP    2003-520531 A    7/2003
JP    2007-074726 A    3/2007
(Continued)

OTHER PUBLICATIONS

International Search Report; PCT/JP2011/002428; Jun. 7, 2011.
(Continued)

*Primary Examiner* — Shaima Q Aminzay
(74) *Attorney, Agent, or Firm* — Studebaker & Brackett PC (57) ABSTRACT

A radio communication system including a relaying apparatus and a base station, at an installment of a new base station, a parameter is autonomously adjusts a parameter to maintain a communication of the relaying apparatus. The new base station transmits a radio signal while increasing a transmission power, and the relaying apparatus, upon detecting the radio signal, transmits a signal indicating detection of the signal to an existing base station. The existing base station, upon receiving the signal indicating the detection, reduces an transmission power thereof to a minimum power to maintain a communication with a relaying apparatus and adjusts the parameter to set the transmission power to the minimum transmission power. The new base station, based on the transmission power at a time when the relaying apparatus has detected the radio signal, sets the parameter of the transmission power.

4 Claims, 6 Drawing Sheets

(51) Int. Cl.
*H04W 52/36* (2009.01)
*H04W 52/46* (2009.01)
*H04W 84/04* (2009.01)
*H04W 52/14* (2009.01)

(56) References Cited

U.S. PATENT DOCUMENTS

2007/0053433 A1 3/2007 Song
2008/0062906 A1 3/2008 Baker et al.
2009/0141025 A1 6/2009 Sugama
2010/0105377 A1 4/2010 Iwamura et al.
2010/0128995 A1 5/2010 Drugeon et al.

FOREIGN PATENT DOCUMENTS

| JP | 2007-532079 A | 11/2007 |
| JP | 2008-172380 A | 7/2008 |
| JP | 2009-134620 A | 6/2009 |
| WO | 2005/125249 A1 | 12/2005 |
| WO | 2009/090884 A1 | 7/2009 |

OTHER PUBLICATIONS

International Search Report; PCT/JP2011/002425; Jul. 12, 2011.

METHOD FOR ADJUSTING PARAMETER OF RADIO COMMUNICATION SYSTEM AND RADIO COMMUNICATION SYSTEM

CROSS REFERENCE TO RELATED APPLICATION

This application claims priority to and the benefit of Japanese Patent Application No. 2010-101434 filed on Apr. 26, 2010, the entire contents of which are incorporated herein by reference.

TECHNICAL FIELD

The present invention relates to a radio communication system, and more specifically, to a radio communication system including a relaying apparatus and a radio base station and a method for adjusting parameters of the radio communication system.

BACKGROUND ART

A communication environment of a communication system including a base station and a mobile station is deteriorated in an area distant from the base station and an area with a poor signal condition. In such cases, the relaying apparatus such as a repeater is installed to improve the communication condition. Even though the communication condition is improved by the relaying apparatus, the communication condition may still be deteriorated due to an environmental change and thus the mobile station may not be able to maintain a communication with the base station or the relaying apparatus. As such, a new base station is installed in the communication system including existing relaying apparatus and base station, in order to enhance and improve an existing communication condition.

When the new base station is installed, it has been necessary to conduct a field test (FT) before installation to obtain information about the existing communication condition in the neighborhood of an installing position. Then, based on a result of the field test, parameters of the new base station are manually adjusted and parameters of the existing base station are adjusted via EMS (Element Management System) for controlling the base station. Here, the parameters of the base station are information about an area formation such as a transmission power and a user capacity, information about handover such as an identification data (ID) of a handover destination candidate base station and an ID of a non-handover destination candidate base station, and setting information reflecting an operation policy such as communication scheduling algorithm. Conventionally, a carrier has been adjusting the parameters for a communication of the base station by creating an information file reflecting the parameters and applying the information file to the base station via EMS. Needless to say, however, such a work requires labor costs and imposes a financial burden on the carrier. This cost is referred to as CAPEX/OPEX (Capital Expenditure/Operation Expenditure). CAPEX/OPEX is a term indicative of a cost for installation and operation of an apparatus included in the system such as the base station.

As a method to reduce CAPEX/OPEX, automation of adjustment of the base station and parameter setting has been considered. As such, a technique that allows the new base station to autonomously obtain setting information of peripheral base stations and to adjust the parameters on its own has been considered (for example, see Patent Document 1).

For automated control of the communication system, on the other hand, a concept of SON (Self Organizing Network) of LTE (long Term Evolution) has also been considered. SON is a concept for automation of adjustment and parameter setting of a base station that handles LTE. Complying with SON enables reduction in cost in installment and maintenance of the base station that handles LTE. As a result, CAPEX/OPEX required from installation to operation of the base station may be reduced. Further, in addition to reduction in CAPEX/OPEX, such automation enables to avoid human error.

In an LTE system, the communication system is generally configured by using FDD (Frequent Division Duplex). Therefore, in order to measure interference with the existing base station when the new base station is installed, the new base station needs to obtain information associated with a downlink signal such as existence of the downlink signal from another base station and signal intensity. As such, a function to receive the downlink signal from another base station may be provided to the base station, although it is of course costly. Alternatively, the base station may obtain the information about the downlink signal of another base station from the mobile station in communication with the base station. However, since contents and accuracy of the obtained information are changed as the mobile station moves, interference with the existing base station may not be stably measured.

In order to solve such a problem, the base station may obtain the information about the downlink signal from the repeater, instead of the mobile station, serving as the relaying apparatus. Since the repeater has an uplink signal transmission function in addition to a downlink signal receiving function and is fixedly installed, the repeater may determine existence of a received downlink signal and the signal intensity from a fixed position. Therefore, the base station may obtain more stable information by using the repeater than the information obtained by using the mobile station to measure the downlink signal.

RELATED ART DOCUMENT

Patent Document

Patent Document 1: WO2005/125249 brochure

SUMMARY OF INVENTION

Technical Problem

In the communication system including the relaying apparatus and the base station, however, when the parameters are autonomously adjusted between the new base station and the existing base station in installment of the new base station, a preexisting communication of the mobile station with the base station via the relaying apparatus may be affected. This is because, since the relaying apparatus are often installed in an area with a poor communication condition and susceptible to a change in the communication condition, a connection between the relaying apparatus and the existing base station serving as an access point easily becomes unstable due to a change in the transmission power and the like of the access point upon the autonomous control between the base stations.

An object of the present invention, in consideration of such a problem, is to provide a radio communication system and a method, in the communication system including the relaying apparatus and the base station, for autonomously adjusting the parameters such that the communication of the relaying apparatus may be maintained when the new base station starts operation.

Solution to Problem

In order to achieve the above object, a method for adjusting a parameter of a radio communication system, according to a first aspect of the present invention, including a plurality of base stations connected to one another via a network and at least one relaying apparatus for relaying a communication between one of the base stations and a mobile station, includes:

a step for a new base station newly installed to transmit a radio signal while increasing a transmission power;

a step for the relaying apparatus, when having detected a radio signal from the new base station, to transmit a signal indicating detection of the radio signal to an existing base station connected to the relaying apparatus;

a step for the existing base station, when having received the signal indicating detection of the radio signal, to reduce a transmission power of the radio signal of the existing base station to a minimum transmission power to maintain a communication with the at least one relaying apparatus connected to the existing base station;

a step for the existing base station to adjust the parameter of the transmission power of the existing base station to set the transmission power of the existing base station to the minimum transmission power; and a step for the new base station to obtain information about a time when the relaying apparatus detects the radio signal from the new base station via the network and, based on the transmission power of the new base station at the time, to set the parameter of the transmission power of the new base station.

A second aspect of the present invention is the method for adjusting the parameter according to the first aspect, having a step for the at least one relaying apparatus to select a base station to connect based on the transmission power from each of the plurality of base stations.

A third aspect of the present invention is the method for adjusting the parameter according to the second aspect, wherein the at least one relaying apparatus has an antenna direction control unit for controlling a direction of an antenna, and the method further includes a step to control the direction of the antenna based on the base station to connect.

In order to achieve the above object, a radio communication system according to a fourth aspect of the present invention includes a plurality of base stations connected to one another via a network and at least one relaying apparatus for relaying a communication between one of the base stations and a mobile station, wherein the base station includes:

a first transmission/reception unit configured to transmit and to receive a radio signal;

a management unit configured to manage a parameter of a transmission power for transmitting the radio signal; and a first control unit configured to control the transmission power, the relaying apparatus includes:

a second transmission/reception unit configured to transmit to and receive from the base station the radio signal; and a second control unit configured to, when the second transmission/reception unit receives a predetermined radio signal, transmit a signal indicating detection of the predetermined radio signal to the connected base station, and wherein when the base station is a new base station newly installed, the first control unit controls to transmit the predetermined radio signal from the first transmission/reception unit while increasing the transmission power, and the management unit obtains information about a time when the relaying apparatus has detected the predetermined radio signal via the network and, based on the transmission power at the time, sets the parameter of the transmission power, or when the base station is an existing base station, upon reception of the signal indicating detection of the predetermined radio signal, the first control unit reduces the transmission power of the radio signal to a minimum transmission power to maintain a communication with the at least one relaying apparatus connected to the existing base station, and the management unit adjusts the parameter of the transmission power to set the transmission power to the minimum transmission power.

EFFECT OF THE INVENTION

According to the present invention, when the new base station is installed and starts operation, the parameter of the new base station may be adjusted such that a communication of an existing relaying apparatus using an existing base station as an access point may be maintained.

DESCRIPTION OF EMBODIMENT

An embodiment of the present invention will be described with reference to the accompanying drawings.

Figure 1:
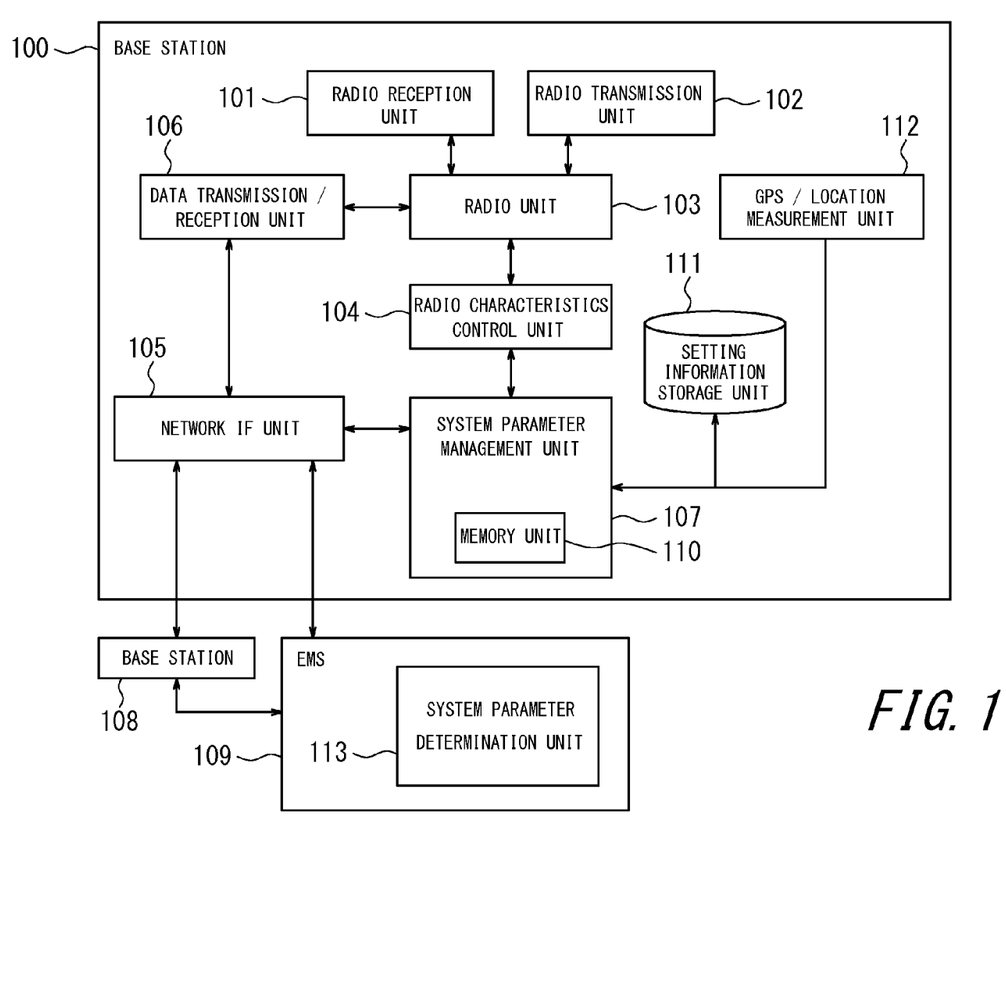
FIG. 1 is a functional block diagram illustrating a schematic configuration of a base station constituting a radio communication system according to one embodiment of the present invention.

FIG. 1 is a functional block diagram illustrating a schematic configuration of a base station constituting a radio communication system according to one embodiment of the present invention. Each base station communicates with a mobile station (terminal) by using FDD. A base station 100, via a network interface (IF) unit 105, communicates with another base station 108 and an EMS 109 in the radio communication system. The EMS 109 is installed at, for example, a management center for managing the radio communication system and has a system parameter determination unit 113, which will be described below, for monitoring and operating the entire system.

The base station 100 includes a radio reception unit 101 and a radio transmission unit 102 for communicating with the terminal or a relaying apparatus such as a repeater. A radio unit 103 converts a radio signal on a reception frequency received by the radio reception unit 101 into data. Also, the radio unit 103 converts data to be transmitted from the radio transmission unit 102 into a radio signal on a transmission frequency. A radio characteristics control unit 104 controls a transmission power of the radio unit 103 based on parameters obtained from the EMS 109 via the network IF unit 105 and managed by a system parameter management unit 107 which includes a memory unit 110. Upon receiving a notification, from a connected repeater, that a predetermined radio signal of a new base station is detected, the radio characteristics control unit 104 reduces the transmission power of the radio signal to a minimum transmission power to maintain a communication with the connected repeater (a detailed description will be presented below). A data transmission/reception unit 106 transmits data obtained in a communication with the base station 108 or the EMS 109 via the network IF unit 105 to the radio unit 103. The base station 100 further includes a setting information storage unit 111 for storing setting information such as an IP address essential for a communication and a GPS location measurement unit 112 for obtaining location information of the base station 100 itself. The base station 108 has a similar configuration as the base station 100.

Figure 2:
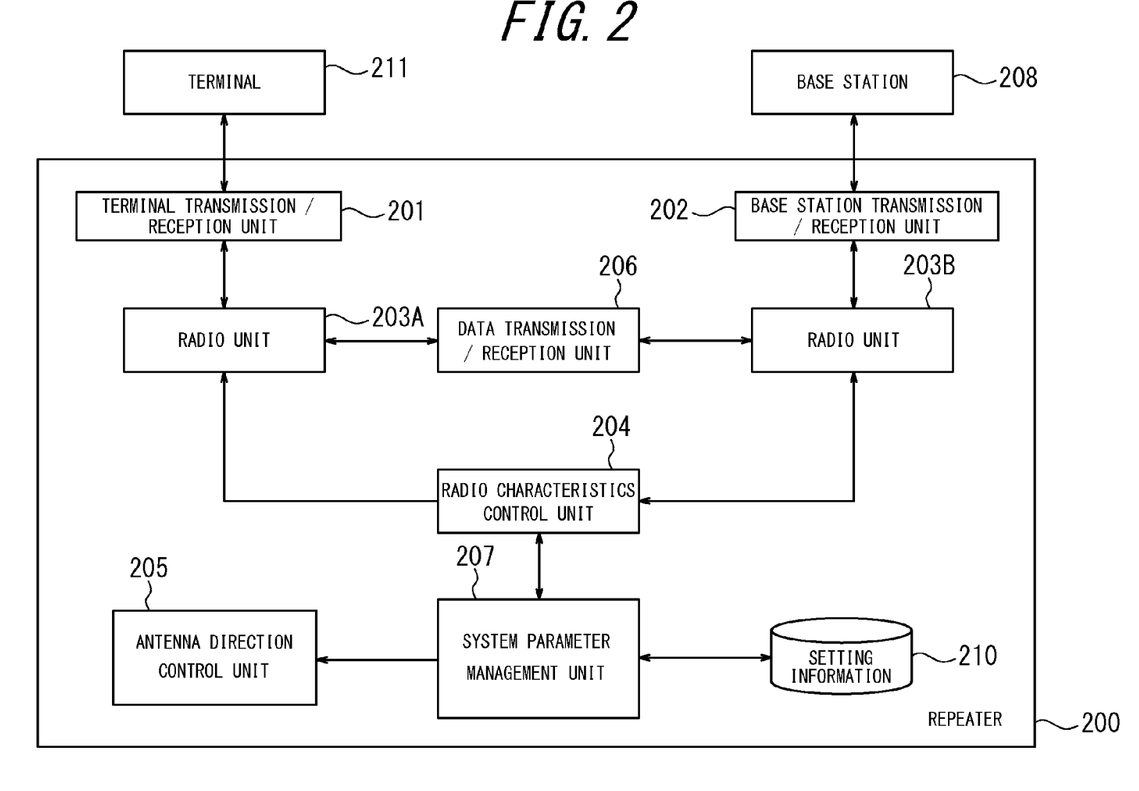
FIG. 2 is a functional block diagram illustrating a schematic configuration of a repeater constituting the radio communication system according to one embodiment of the present invention.

FIG. 2 is a functional block diagram illustrating a schematic configuration of the repeater serving as the relaying apparatus constituting the radio communication system according to one embodiment of the present invention. The repeater 200 includes a terminal transmission/reception unit 201 for exchanging data with a terminal 211 and a base station transmission/reception unit 202 for exchanging data with a base station 208, which has a similar configuration as the base stations 100 and 108 described above and serves as an access point. The repeater 200, in order to relay the data received from the terminal 211 to the base station 208, processes the data received by the terminal transmission/reception unit 201 by using a radio unit 203A and transmits the data to a radio unit 203B via a data transmission/reception unit 206. The radio unit 203B processes the received data into, for example, a signal on an uplink frequency. Then, the base station transmission/reception unit 202 transmits the data processed by the radio unit 203B to the base station 208. The repeater 200, in relaying the data received from the base station 208 to the terminal 211, transmits the data received by the base station transmission/reception unit 202 from the terminal transmission/reception unit 201 to the terminal 211 via the radio unit 203B, the data transmission/reception unit 206 and the radio unit 203A.

A system parameter management unit 207, based on system parameters the system parameter management unit 207 itself manages, makes a radio characteristics control unit 204 (second control unit) control the radio units 203A and 203B and controls an antenna direction control unit 205. The antenna direction control unit 205 controls an antenna by performing, for example, tilting and beam forming. A memory unit 210 stores the system parameters received via the base station transmission/reception unit 202 and the radio unit 203B. The system parameters are set by the EMS 109 and transmitted from the base station 208 serving as the access point.

The radio characteristics control unit 204, based on the system parameters managed thereby, controls transmission power of the radio units 203A and 203B. The system parameters associated with the transmission power correspond to a value determined by the system parameter determination unit 113 of the EMS 109. Also, the radio characteristics control unit 204, when the base station transmission/reception unit 202 receives the predetermined radio signal, transmits a signal indicating detection of the predetermined radio signal to the connected base station.

Figure 3:
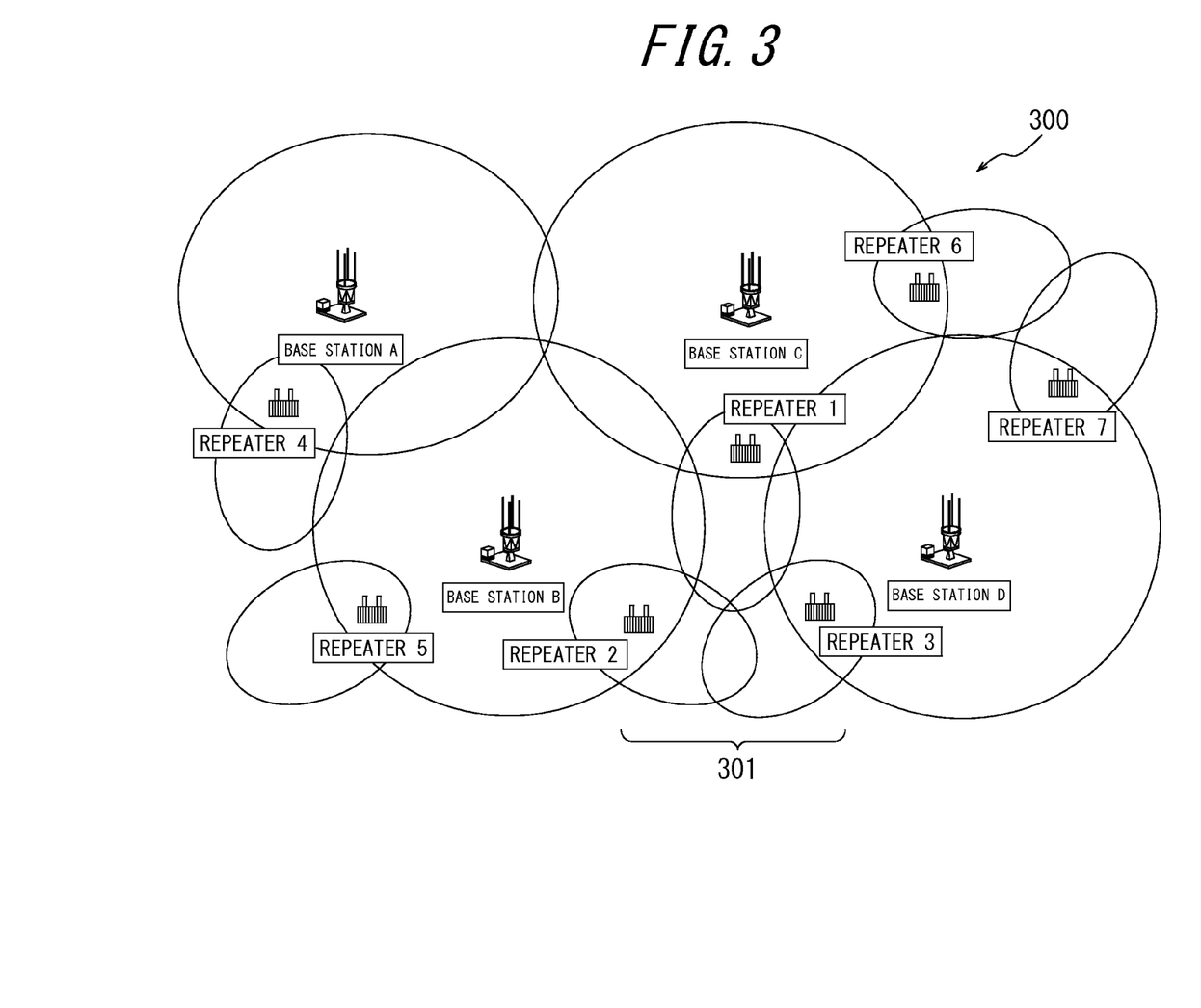
FIG. 3 is a diagram illustrating a configuration of a communication area of the radio communication system according to one embodiment of the present invention.

Referring to FIGS. 3-6, the following is a description of a method for adjusting the parameters for improving a communication area when the new base station is installed in the radio communication system according to the present embodiment. Here, it is assumed that the radio communication system is constituted by using a communication area 300 illustrated in FIG. 3. Base stations A-D illustrated in FIGS. 3-6 have similar configurations as the base stations 100, 108 and 208 described above. Also, repeaters 1-7 have similar configuration as the repeater 200 described above. In FIG. 3, each circle around the base stations A-D represents a cell of each of the base stations. The repeaters 1-7 using either one of the base stations A-D as the access points are provided for enhancing the communication area 300. For example, the base station A is provided with the repeater 4, the base station B is provided with the repeaters 2 and 5, the base station C is provided with the repeaters 1 and 6, and the base station D is provided with the repeaters 3 and 7. In an area 301 belonging to none of the cells of the base stations B, C and D, a communication is enabled by the repeaters 1-3.

Each of the base stations A-D holds information about a handover destination candidate base station and IP address information thereof. For example, the base station C holds IP address information of the base stations A, B and D in the neighborhood thereof as the information about the handover destination candidate base stations.

Now, it is assumed that each of the base stations A-D is in communication with terminals as many as over 80% of their maximum terminal capacities. Under such a condition, when a transporter carrying numerous communication terminals such as a bus or a train transporting passengers enters the communication area 300 illustrated in FIG. 3, there is a risk to cause communication congestion in the communication area 300. According to the present embodiment, therefore, a base station E is newly provided in the area 301 where a communication is enabled by the repeaters 1-3.

Figure 4:
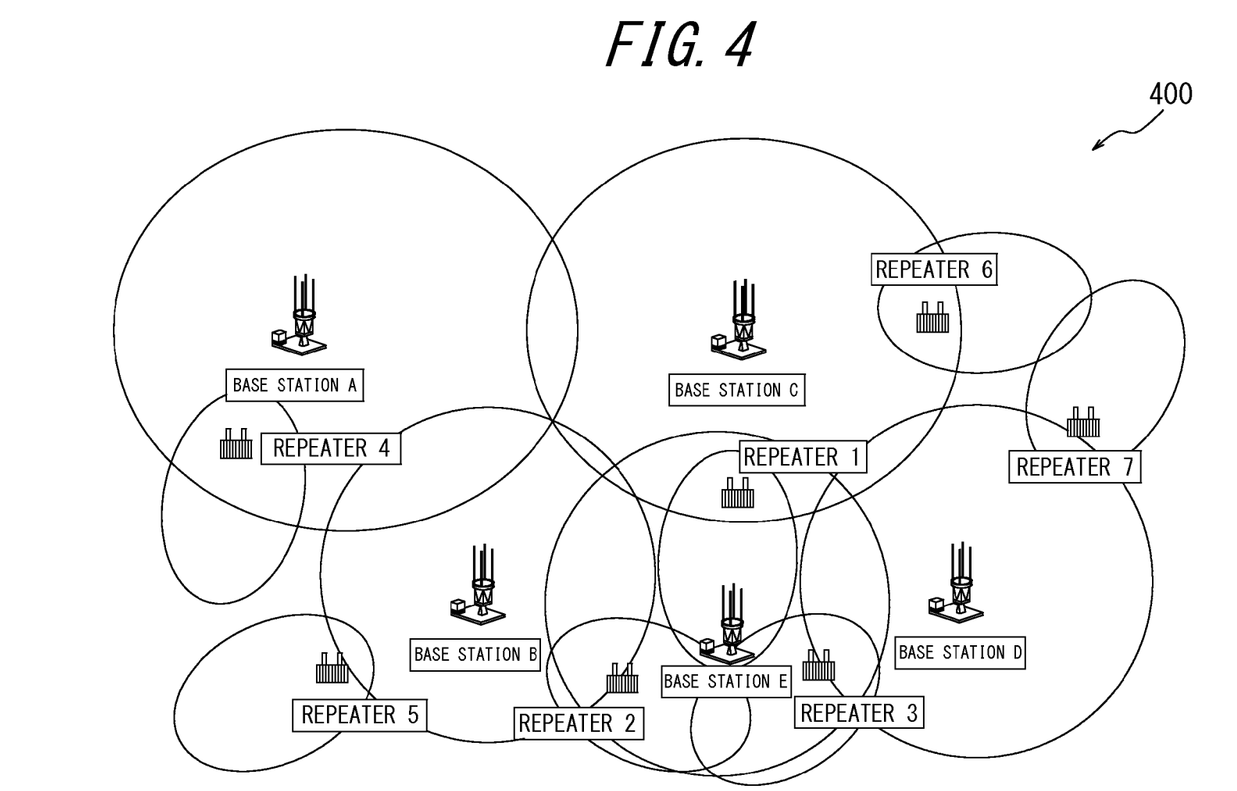
FIG. 4 is a diagram illustrating a configuration of the communication area of the radio communication system according to one embodiment of the present invention.

Before starting an actual communication, the base station E first transmits a radio signal (predetermined radio signal) with a low transmission power by using a control channel (CCH) under control of the radio characteristics control unit 104 while gradually increasing the transmission power. In this process, the repeaters 1-3 provided around the base station E become capable of supplementing a control channel signal of the base station E. While the base station E gradually increases the transmission power, the base stations B-D existing in the neighborhood of the base station E gradually reduces their transmission power. As illustrated in FIG. 4, as a result, the cells of the base stations B and D become smaller than those illustrated in FIG. 3, reducing a risk of interference with the base station E.

Figure 5:
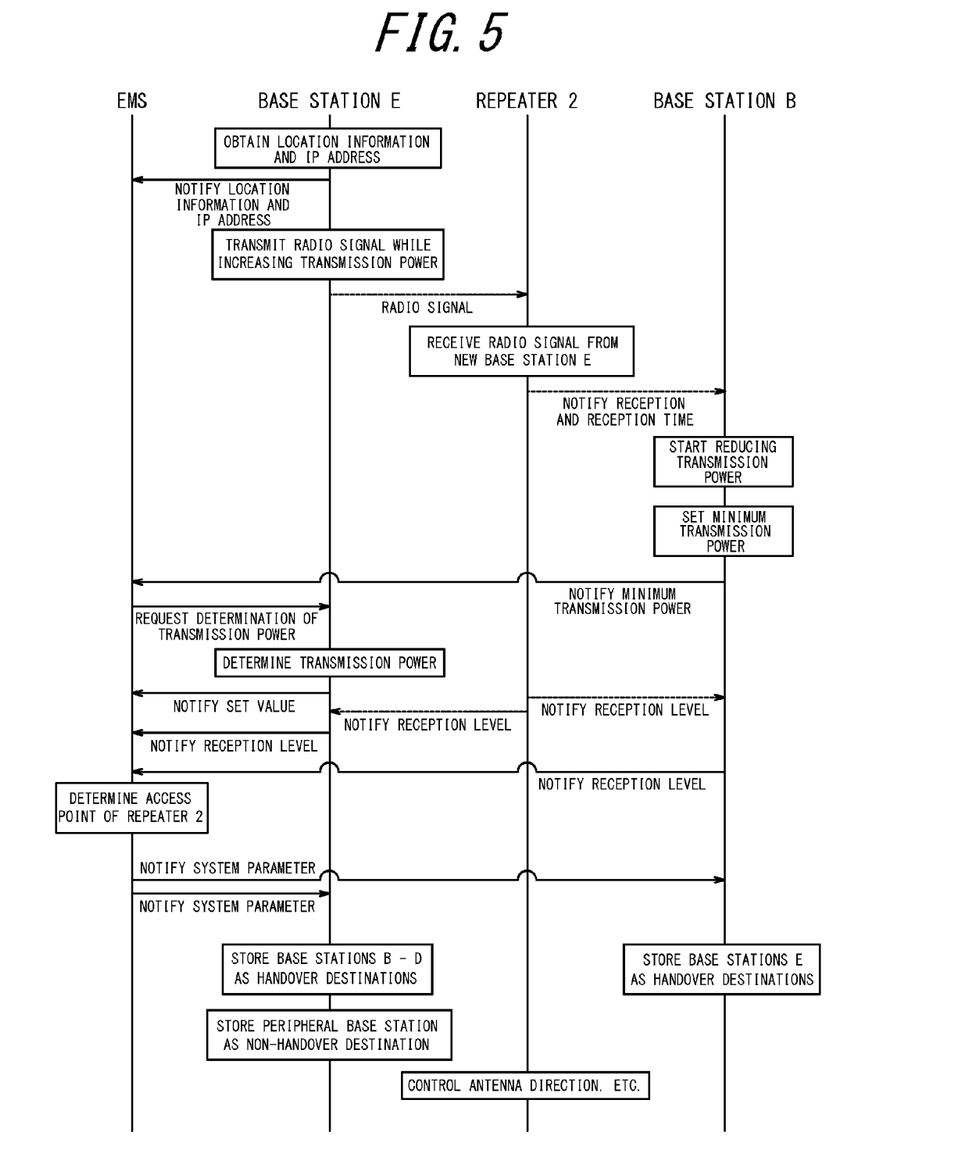
FIG. 5 is a sequence diagram illustrating a method for adjusting parameters according to one embodiment of the present invention.

Referring to a schematic sequence diagram illustrated in FIG. 5, the following is a description of the method for adjusting the parameters according to one embodiment of the present invention. In FIG. 5, broken lines represent radio communications and solid lines, in principle, represent wired communications.

As soon as being installed, the base station E is automatically assigned with an IP address by DHCP (Dynamic Host Configuration Protocol) via a network. Also, the base station E, upon installation, automatically obtains location information thereof by a GPS location measurement unit 112. Then, the base station E notifies the EMS 109 of the assigned IP address and the obtained location information. Thereby, the system parameter determination unit 113 of the EMS 109 acquires a positional relationship between the base station E, the base stations existing in the neighborhood of the base station E and the repeaters and also an area configuration around the base station E.

The base station E, after notifying the EMS 109 of the location information and the IP address thereof, transmits the radio signal from the radio transmission unit 102 through CCH while gradually increasing the transmission power. The base station E increases the transmission power either in stages or continuously. Here, it is assumed that the repeater 2, which is the closest to the base station E, receives the signal transmitted from the base station E quicker than any other repeaters in the neighborhood of the base station E. The repeater 2, when the base station transmission/reception unit 202 receives the radio signal transmitted from the base station E, notifies the base station B serving as the access point thereof accordingly. At this time, the repeater 2, in addition to reception of the radio signal from the base station E, notifies the base station B of information about a reception time. The information about the reception time is then provided to the base station E such that the base station E holds the information about the reception time and the transmission power at that time in relation to one another.

The base station B, being notified, notifies the EMS 109 via the network IF unit 105 of that the repeater 2 has received the signal from the base station E, and starts gradually reducing the transmission power of the base station B itself. The base station B, while communicating with the repeater 5 which uses the base station B as the access point, makes the radio characteristics control unit 104 control the radio unit 103 to gradually reduce the transmission power down to the minimum transmission power to maintain the communication with the repeater 5. Then, after determining the minimum transmission power, the base station B notifies the EMS 109 of the determined minimum transmission power. Although not illustrated in FIG. 6, the base station D, as the access point, similarly reduces the transmission power down to the minimum transmission power to maintain a communication with the repeater 7 which uses the base station D and does not receive the signal from the base station E, and notifies the EMS 109 of the minimum transmission power.

Then, the EMS 109 instructs the base station E to determine the transmission power and notifies the base station E of the information about the time when the repeater 2 has received the signal from the base station E. The base station E, in order to enable the repeater 2 to have a stable communication therewith, sets the transmission power of the base station E itself based on the transmission power at the time when the signal has been received. When the transmission power is increased in stages, for example, the base station E sets the transmission power to a signal output value at one or a few stages after the time when the signal has been received. When the transmission power is increased linearly, the base station E sets the transmission power to one after a predetermined time from the time when the signal has been received. Thereby, the base station E sets the transmission power thereof slightly higher than the transmission power of the time when the signal has been received, for example, 10-20% higher than a standard transmission power. Then, the base station E notifies the EMS 109 of the set transmission power.

Then, the repeater 2 notifies each of the base stations B and E of a reception level of a signal from each of the base stations. Each of the base stations B and E notifies the EMS 109 of the reception level of the repeater 2. Then, the system parameter determination unit 113 of the EMS 109 compares the reception levels and determines one of the base stations having a higher reception level as the access point of the repeater 2. In a communication area 400 illustrated in FIG. 4, when the repeater 2 has a higher reception level of the signal from the base station E than that of the signal from the base station B, the EMS 109 determines to change the access point of the repeater 2 from the base station B to the base station E. Similarly, the EMS 109 also compares the reception levels of the signals transmitted from the base stations D and E received by the repeater 3 and determines to change the access point of the repeater 3 from the base station D to the base station E. Then, the EMS 109 notifies the base station B of the system parameters including information about change of the access point of the repeater 2 and also notifies the base station D of the system parameters including information about change of the access point to the repeater 3. When the base stations B and D receive the information from the EMS 109, the system parameter management unit 107 stores the information in the setting information storage units 111.

Also, the EMS 109, based on the location information and the IP address obtained from the base station E, determines a positional relationship between the base station E and the existing base stations A-D. Then, the EMS 109 instructs the base stations B-D in the neighborhood of the base station E to add the ID of the base station E as the handover destination candidate base station. Upon receiving the instruction, the setting information storage units 111 of the base stations B-D add the ID of the base station E as the handover destination candidate base station. Further, the EMS 109 instructs the base station E to store the IDs of the base stations B-D as the handover destination candidate base stations. The system parameter determination unit 113 of the EMS 109, based on the positional relationship between the base stations A-E and sizes of the cells of those base stations, determines that the cells of the base stations A and E do not overlap with each other despite their geographical closeness, and instructs the base station E to store the ID of the base station A as a non-handover destination base station. Upon receiving the instruction, the base station E stores accordingly in the setting information storage unit 111.

Figure 6:
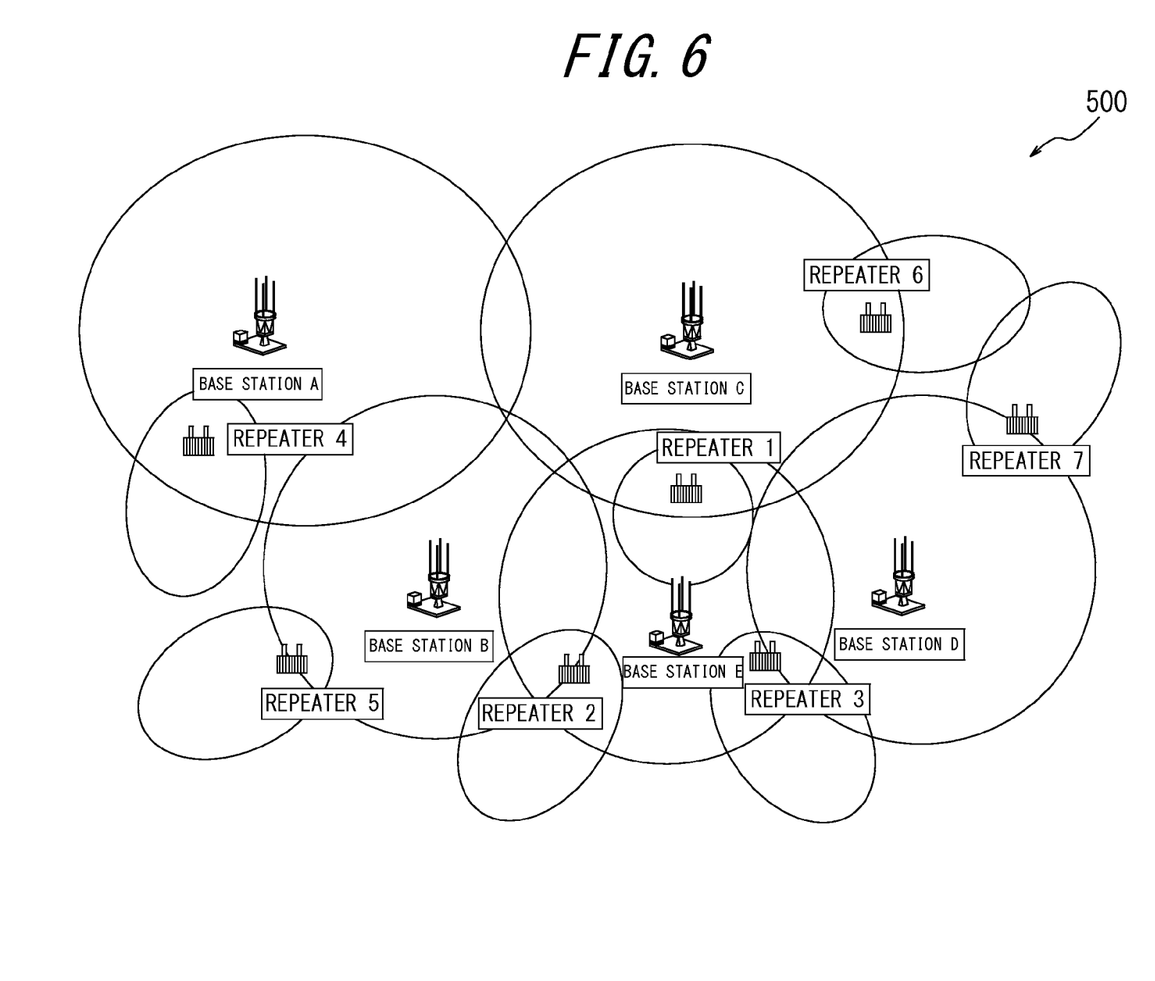
FIG. 6 is a diagram illustrating a configuration of the communication area of the radio communication system according to one embodiment of the present invention.

Subsequently, the EMS 109, based on the location information of each of the base stations and each of the repeaters and the transmission power of each of the base stations, generates parameters for beam forming and tilting of the repeaters 1-7 disposed in the area, that is, parameters for adjusting directions of the antennas, in order to optimize the area configuration. Then, the EMS 109 transmits, via the base station E, the generated parameters to the system parameter management unit 207 of each of the repeaters 2 and 3 which have changed their access points to the base station E. The antenna direction control units 205 of the repeaters 2 and 3 control directions of the antennas based on the parameters received by the system parameter management units 207 so as to adjust beam forming and tilting as illustrate in FIG. 6. Thereby, a stabled system operation is enabled. Also, as illustrated in FIG. 6, the repeater 1 using the base station C as the access point controls the direction of the antenna based on the parameters transmitted from the EMS 109 via the base station C so as to prevent interference with the base station E, for example, and controls the transmission power. Thereby, power consumption may be reduced.

According to the method for adjusting the parameters according to the present embodiment, as described above, since the repeater receives the signal transmitted from the new base station and notifies the existing base station accordingly, the existing base station may stably obtain the information about the signal transmitted from the new base station without increasing the cost of the base station such as by newly providing a reception unit. Also, the method for adjusting the parameters according to the present embodiment enables the existing base station and the new base station to autonomously optimize the transmission powers while maintaining a communication with the repeater.

Although the method for adjusting the parameters of the communication system is described according to one embodiment of the present invention, it is to be understood that those who are skilled in the art may easily vary or alter in a multiple manner based on disclosure of the present invention. For example, although the EMS determines the system parameters according to the present embodiment, the base station itself may determine the system parameters.

Also, although the transmission power of the base station E is determined based on the signal output value at the time when the repeater 2 closest to the base station E receives the signal from the base station E, the EMS may determine the transmission power of the base station E by using, for example, times when the signals are received by a plurality of repeaters. In this case, the EMS may calculate the transmission power based on weighting or statistical processing.

REFERENCE SIGNS LIST 100 base station
101 radio reception unit
102 radio transmission unit
103 radio unit
104 radio characteristics control unit
105 network IF unit
106, 206 data transmission/reception unit
107, 207 system parameter management unit
108, 208 base station
109 EMS
110, 210 memory unit
111 setting information storage unit
112 GPS location measurement unit
113 system parameter determination unit
200 repeater
201 terminal transmission/reception unit
202 base station transmission/reception unit
203A, 203B radio unit
204 radio characteristics control unit
205 antenna direction control unit
211 terminal
300, 400, 500 communication area
301 area

The invention claimed is:

1. A method for adjusting a parameter of a radio communication system including a plurality of base stations connected to one another via a network and at least one relaying apparatus for relaying a communication between one of the base stations and a mobile station, comprising:
   a step for a new base station newly installed to transmit a radio signal while increasing a transmission power;
   a step for the relaying apparatus, when having detected a radio signal from the new base station, to transmit a signal indicating detection of the radio signal to an existing base station connected to the relaying apparatus;
   a step for the existing base station, when having received the signal indicating detection of the radio signal, to reduce a transmission power of the radio signal of the existing base station to a minimum transmission power to maintain a communication with the at least one relaying apparatus connected to the existing base station;
   a step for the existing base station to adjust the parameter of the transmission power of the existing base station to set the transmission power of the existing base station to the minimum transmission power; and
   a step for the new base station to obtain information about a time when the relaying apparatus detects the radio signal from the new base station via the network and, based on the transmission power of the new base station at the time, to set the parameter of the transmission power of the new base station.

2. The method according to claim 1 further comprising a step for the at least one relaying apparatus to select a base station to connect based on the transmission power from each of the plurality of base stations.

3. The method according to claim 2, wherein the at least one relaying apparatus has an antenna direction control unit for controlling a direction of an antenna, and the method further includes a step for the antenna direction control unit to control the direction of the antenna based on the base station to connect.

4. A radio communication system comprising a plurality of base stations connected to one another via a network and at least one relaying apparatus for relaying a communication between one of the base stations and a mobile station, wherein the base station includes:
   a first transmission/reception unit configured to transmit and to receive a radio signal;
   a management unit configured to manage a parameter of a transmission power for transmitting the radio signal; and
   a first control unit configured to control the transmission power, the relaying apparatus includes:
   a second transmission/reception unit configured to transmit to and receive from the base station the radio signal; and
   a second control unit configured to, when the second transmission/reception unit receives a predetermined radio signal, transmit a signal indicating detection of the predetermined radio signal to the connected base station, and wherein
   when the base station is a new base station newly installed, the first control unit controls to transmit the predetermined radio signal from the first transmission/reception unit while increasing the transmission power, and the management unit obtains information about a time when the relaying apparatus has detected the predetermined radio signal via the network and, based on the transmission power at the time, sets the parameter of the transmission power, or
   when the base station is an existing base station, upon reception of the signal indicating detection of the predetermined radio signal, the first control unit reduces the transmission power of the radio signal to a minimum transmission power to maintain a communication with the at least one relaying apparatus connected to the existing base station, and the management unit adjusts the parameter of the transmission power to set the transmission power to the minimum transmission power.

* * * * *